(12) United States Patent
Vilnai et al.

(10) Patent No.: US 8,292,168 B2
(45) Date of Patent: Oct. 23, 2012

(54) SYSTEM AND METHOD FOR AUTHORIZING PURCHASES ASSOCIATED WITH A VEHICLE

(75) Inventors: Yoav Vilnai, Tel-Aviv (IL); Avi Yalon, Ramat-Gan (IL); Shimon Weitzhandler, RaAnana (IL)

(73) Assignee: Petratec International Ltd., Hod-HaSharon (IL)

( * ) Notice: Subject to any disclaimer, the term of this patent is extended or adjusted under 35 U.S.C. 154(b) by 103 days.

(21) Appl. No.: 12/083,968

(22) PCT Filed: Oct. 24, 2006

(86) PCT No.: PCT/IL2006/001221
§ 371 (c)(1),
(2), (4) Date: Apr. 23, 2008

(87) PCT Pub. No.: WO2007/049273
PCT Pub. Date: May 3, 2007

(65) Prior Publication Data
US 2009/0289113 A1 Nov. 26, 2009

Related U.S. Application Data

(60) Provisional application No. 60/729,215, filed on Oct. 24, 2005, provisional application No. 60/762,498, filed on Jan. 27, 2006.

(51) Int. Cl.
*G06F 7/08* (2006.01)
(52) U.S. Cl. ...................................................... 235/381
(58) Field of Classification Search .................... 235/381
See application file for complete search history.

(56) References Cited

U.S. PATENT DOCUMENTS

| | | | |
|---|---|---|---|
| 4,469,149 A | 9/1984 | Walkey et al. |
| 5,184,309 A | 2/1993 | Simpson et al. |
| 5,605,182 A | 2/1997 | Oberrecht et al. |
| 5,727,608 A | 3/1998 | Nusbaumer et al. |

(Continued)

FOREIGN PATENT DOCUMENTS
DE 10241323 5/2004
(Continued)

OTHER PUBLICATIONS

International Search Report Dated Oct. 6, 2008 From the International Searching Authority Re.: Application No. PCT/IL2008/000349.

(Continued)

*Primary Examiner* — Daniel Hess
*Assistant Examiner* — David Tardif

(57) ABSTRACT

Disclosed is a system for authorizing purchases associated with a vehicle for example at a service station, the system including an identification tag associated with the vehicle, a data storage device associated with the vehicle for storing vehicular data, at least one tag reader configured to read and transmit data from the identification tag and a station relay unit configured to receive the transmitted and to transmit an authorization signal. Disclosed is also a method of authorizing a purchase associated with a vehicle, for example at a service station, comprising associating with a first identifier and a second identifier with a vehicle, when requested to authorize a purchase associated with said vehicle, acquiring the first identifier and the second identifier, determining that the acquired first and second identifiers are correctly associated and if the first acquired identifier and said second acquired identifier are associated, authorizing the purchase.

8 Claims, 1 Drawing Sheet

U.S. PATENT DOCUMENTS

| | | | | |
|---|---|---|---|---|
| 5,742,229 | A | * | 4/1998 | Smith .......................... 340/438 |
| 5,858,501 | A | | 1/1999 | Malone |
| 5,887,367 | A | | 3/1999 | Alvern |
| 5,906,228 | A | | 5/1999 | Keller |
| 5,913,180 | A | * | 6/1999 | Ryan .............................. 702/45 |
| 5,923,572 | A | | 7/1999 | Pollock |
| 5,933,788 | A | | 8/1999 | Faerber et al. |
| 5,944,069 | A | | 8/1999 | Nusbaumer et al. |
| 6,024,142 | A | * | 2/2000 | Bates .............................. 141/94 |
| 6,075,707 | A | | 6/2000 | Ferguson et al. |
| 6,085,805 | A | | 7/2000 | Bates |
| 6,089,284 | A | * | 7/2000 | Kaehler et al. .................. 141/94 |
| 6,232,877 | B1 | * | 5/2001 | Ashwin ...................... 340/572.1 |
| 6,313,737 | B1 | | 11/2001 | Freeze et al. |
| 6,317,098 | B1 | | 11/2001 | Andrews et al. |
| 6,338,008 | B1 | | 1/2002 | Kohut et al. |
| 6,343,241 | B1 | | 1/2002 | Kohut et al. |
| 6,374,870 | B1 | | 4/2002 | Müller |
| 6,411,824 | B1 | | 6/2002 | Eidson |
| 6,433,742 | B1 | | 8/2002 | Crawford |
| 6,560,443 | B1 | | 5/2003 | Vaisanen et al. |
| 6,648,032 | B1 | | 11/2003 | Kelrich et al. |
| 6,799,614 | B1 | | 10/2004 | Smith et al. |
| 6,899,151 | B1 | | 5/2005 | Latka et al. |
| 7,034,683 | B2 | | 4/2006 | Ghazarian |
| 7,042,357 | B2 | | 5/2006 | Girvin et al. |
| 7,119,690 | B2 | | 10/2006 | Lerch et al. |
| 7,427,955 | B2 | | 9/2008 | Choi et al. |
| 2003/0146876 | A1 | | 8/2003 | Greer et al. |
| 2004/0079799 | A1 | | 4/2004 | Symonds et al. |
| 2004/0156339 | A1 | | 8/2004 | Urquhart et al. |
| 2004/0203360 | A1 | | 10/2004 | Yamagiwa |
| 2004/0221920 | A1 | | 11/2004 | Ferguson et al. |
| 2004/0257229 | A1 | | 12/2004 | Girvin et al. |
| 2006/0003739 | A1 | * | 1/2006 | Sasakura et al. ............... 455/411 |
| 2006/0012479 | A1 | * | 1/2006 | Ezra ........................... 340/572.1 |
| 2006/0049249 | A1 | | 3/2006 | Sullivan |
| 2006/0145926 | A1 | | 7/2006 | Choi et al. |
| 2006/0237528 | A1 | * | 10/2006 | Bishop et al. .................. 235/380 |
| 2007/0250452 | A1 | | 10/2007 | Leigh et al. |
| 2009/0045978 | A1 | | 2/2009 | Weitzhandler et al. |
| 2009/0289113 | A1 | | 11/2009 | Vilnai et al. |

FOREIGN PATENT DOCUMENTS

| | | | |
|---|---|---|---|
| EP | | 0349316 | 1/1992 |
| EP | | 0642232 | 3/1995 |
| EP | | 0805566 | 11/1997 |
| EP | | 0943584 | 9/1999 |
| EP | | 1099664 | 5/2001 |
| EP | | 1115176 | 7/2001 |
| EP | | 0729426 | 4/2003 |
| EP | | 00906598 | 3/2005 |
| GB | | 2400364 | 10/2004 |
| JP | | 2001101378 A * | 4/2001 |
| WO | WO 01/03983 | | 1/2001 |
| WO | WO 02/087969 | | 11/2002 |
| WO | WO 2005/021419 | | 3/2005 |
| WO | WO 2005/124581 | | 12/2005 |
| WO | WO 2006/044168 | | 4/2006 |
| WO | WO 2006/124270 | | 11/2006 |
| WO | WO 2007/003293 | | 1/2007 |
| WO | WO 2007/049273 | | 5/2007 |
| WO | WO 2007/049274 | | 5/2007 |
| WO | WO 2008/090539 | | 7/2008 |
| WO | WO 2008/096361 | | 8/2008 |
| WO | WO 2008/111075 | | 9/2008 |
| WO | WO 2009/050662 | | 4/2009 |

OTHER PUBLICATIONS

International Search Report Dated Nov. 10, 2008 From the International Searching Authority Re.: Application No. PCT/IL06/01221.
Written Opinion Dated Oct. 6, 2008 From the International Searching Authority Re.: Application No. PCT/IL2008/000349.
Written Opinion Dated Nov. 10, 2008 From the International Searching Authority Re.: Application No. PCT/IL06/01221.
Communication Relating to the Results of the Partial International Search Dated Oct. 20, 2008 From the International Searching Authority Re.: Application No. PCT/IL2008/000349.
International Preliminary Report on Patentability Dated Dec. 11, 2008 From the International Bureau of WIPO Re.: Application No. PCT/IL2006/001222.
International Preliminary Report on Patentability Dated Jan. 22, 2009 From the International Bureau of WIPO Re.: Application No. PCT/IL2006/001221.
International Preliminary Report on Patentability Dated Aug. 6, 2009 From the International Bureau of WIPO Re.: Application No. PCT/IL2007/001575.
International Search Report Dated Mar. 4, 2009 From the International Searching Authority Re.: Application No. PCT/IB2008/054248.
Written Opinion Dated Mar. 4, 2009 From the International Searching Authority Re.: Application No. PCT/IB2008/054248.
International Preliminary Report on Patentability Dated Sep. 24, 2009 From the International Bureau of WIPO Re.: Application No. PCT/IL2008/000349.
Official Action Dated Jan. 5, 2010 From the US Patent and Trademark Office Re.: U.S. Appl. No. 12/083,968.
International Search Report Dated Sep. 4, 2008 From the International Searching Authority Re.: Application No. PCT/IL2008/000168.
Written Opinion Dated Sep. 4, 2008 From the International Searching Authority Re.: Application No. PCT/IL2008/000168.
International Search Report Dated Mar. 20, 2008 From the International Searching Authority Re.: Application No. PCT/IL06/01222.
Written Opinion Dated Mar. 20, 2008 From the International Searching Authority Re.: Application No. PCT/IL06/01222.
Partial International Search Report Dated Jul. 10, 2008 From the International Searching Authority Re.: PCT/IL2008/000349.
International Search Report Dated Jul. 10, 2008 From the International Searching Authority Re.: Application No. PCT/IL2007/001575.
Written Opinion Dated Jul. 10, 2008 From the International Searching Authority Re.: Application No. PCT/IL2007/001575.
International Preliminary Report on Patentability Dated Apr. 29, 2010 From the International Bureau of WIPO Re.: Application No. PCT/IB2008/054248.
Official Action Dated Jun. 22, 2010 From the US Patent and Trademark Office Re. U.S. Appl. No. 12/083,979.
Communication Pursuant to Article 94(3) EPC Dated Sep. 22, 2010 From the European Patent Office Re. Application No. 08840101.3.
Response Dated Oct. 21, 2010 to Official Action of Jun. 22, 2010 From the US Patent and Trademark Office Re. U.S. Appl. No. 12/083,979.
Summons to Attend Oral Proceedings Pursuant to Rule 115(1) EPC Dated Sep. 19, 2011 From the European Patent Office Re. Application No. 08840101.3.
Communication Under Rule 71(3) EPC Dated Jun. 27, 2012 From the European Patent Office Re. Application No. 08840101.3.
Official Action Dated Feb. 6, 2012 From the US Patent and Trademark Office Re. U.S. Appl. No. 12/530,478.
Official Action Dated Jan. 4, 2012 From the US Patent and Trademark Office Re. U.S. Appl. No. 12/524,189.
Response Dated Dec. 19, 2011 to Summons to Attend Oral Proceedings Pursuant to Rule 115(1) EPC of Sep. 19, 2011 From the European Patent Office Re. Application No. 08840101.3.
Communication Pursuant to Article 94(3) EPC Dated Aug. 12, 2011 From the European Patent Office Re. Application No. 07849601.5.
Notice of Allowance Dated Nov. 18, 2010 From the US Patent and Trademark Office Re. U.S. Appl. No. 12/083,979.
Office Action Dated Jul. 20, 2011 From the Israeli Patent Office Re. Application No. 190934 and Its Translation into English.
Examination Report Dated Feb. 16, 2012 From the Instituto Mexicano de la Propriedad Industrial Re. Application No. MX/a/2009/007966 and Its Summary in English.
Examination Report Dated Oct. 21, 2011 From the Instituto Mexicano de la Propriedad Industrial Re. Application No. MX/a/2008/005215 and Its Translation Into English.

Official Action Dated May 14, 2012 From the US Patent and Trademark Office Re. U.S. Appl. No. 12/530,478.
Response Dated Mar. 22, 2011 to Communication Pursuant to Article 94(3) EPC of Sep. 22, 2010 From the European Patent Office Re. Application No. 08840101.3.
Office Action Dated Jun. 3, 2012 From the Israel Patent Office Re. Application No. 190933 and Its Translation Into English.
Office Action Dated Jun. 6, 2012 From the Israel Patent Office Re. Application No. 190934 and Its Translation Into English.
Office Action Dated Jul. 15, 2012 From the Israel Patent Office Re. Application No. 200040 and Its Translation Into English.
Official Action Dated Aug. 16, 2012 From the US Patent and Trademark Office Re. U.S. Appl. No. 12/524,189.

* cited by examiner

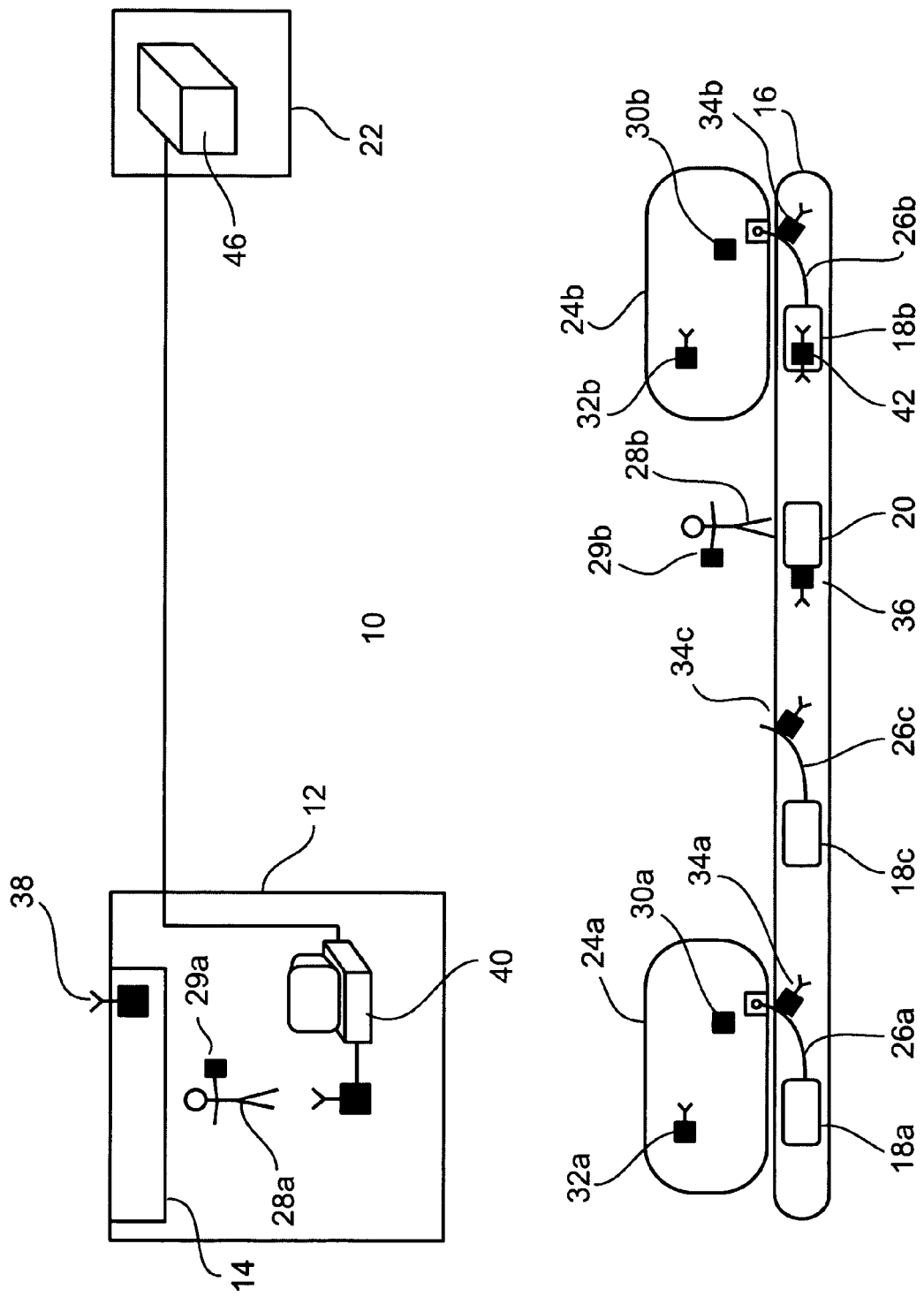

SYSTEM AND METHOD FOR AUTHORIZING PURCHASES ASSOCIATED WITH A VEHICLE

RELATED APPLICATIONS

This application is a National Phase Application of PCT Application No. PCT/IL2006/001221 having International Filing Date of Oct. 24, 2006, which claims the benefit of U.S. Provisional Patent Application No. 60/729,215, filed on Oct. 24, 2005, and U.S. Provisional Patent Application No. 60/762,498, filed on Jan. 27, 2006. The contents of the above Applications are all incorporated herein by reference.

FIELD AND BACKGROUND OF THE INVENTION

The present invention relates to the field of purchase authorization and, more particularly, to systems and methods for authorizing purchases associated with a vehicle as well as for methods relating to operating a fuel-dispensing service station.

In the past a gas station was primarily a location to purchase fuel for a vehicle and occasionally to purchase comestibles and products associated with vehicular operation. Increasingly, gas stations are transforming into service stations, becoming one of the most important retail venues in industrialized society. The reasons for the increasing importance of service stations as retail venues, as well as the nature of the purchases, result from the relative advantages of service stations which are dictated by the primary purpose of service stations: efficiently providing fuel to vehicles.

To be successful as a gas station, a service station must generally be located on a heavily traveled road with large area available for both high speed entrance and egress, many fuel-dispensing locations, arranged for high-throughput refueling of many continuously arriving vehicles and having an efficient method for paying for the fuel. Increasingly, people are found traveling on the road for extended periods of time. On the one hand, this means that people have less time to purchase items at local stores and even to make a special trip for the purpose of shopping, especially as shopping trips often include time wasted in search of parking and walking to and from the vehicle. People have less opportunity to become acquainted with local stores so little loyalty develops to a local store and may not even know where such a store is located. The actual refueling process requires a relatively long time, time which must be used.

As a result of the above factors, persons refueling at a service station find themselves with a car safely parked at a fuel-dispensing location waiting for the fuel to be dispensed, during which purchases of various and sundry goods may be performed. Given the above situation, a service station operator finds it desirable to increase the attractiveness of an own service station relative to other service stations, to increase the revenues from non-fuel purchases performed at the service station and to engender customer loyalty.

Due to the development of sophisticated control electronics and vehicle identification devices, gasoline service stations have evolved into complex electronic systems having point-of-sale (POS) devices able to accommodate various types of payment means, such as, for example, credit cards. Additionally, not only fuel is available for purchase but also other goods and services such as convenience store products.

One preferred method for increasing the attractiveness of a service station is through the use of automated payment for fuel. A vehicle is equipped with an identification tag storing data relating to the vehicle identity and a payment method that is readable by a tag-reader associated with an individual fuel-dispensing location, for example with the fuel-dispensing nozzle. When the fuel-dispensing nozzle is placed inside the refueling port of the vehicle, a tag-reader reads data from the identification tag and transmits the data to a centralized location that issues an authorization signal to dispense fuel if the payment method is valid. Not only are such methods efficient, allowing fuel-dispensing and payment to occur virtually automatically, but such methods reduce the chance of fuel-theft and gas-station robbery.

The advent of advanced service station systems has produced a need for increased transaction efficiency by both customers and goods or services suppliers met, for example, by the development of fully automated authorization and purchasing systems. In fully automated authorization and purchasing systems, the purchase of goods or services at service stations does not require the use of a credit card, debit card, or smart card. Rather, a customer or vehicle is provided with a communications device such as, for example, identification tag, which stores data associated with the customer or vehicle such as, for example, credit account details. The communications device is configured to communicate with other components of the service station systems such as, for example, fuel dispensers and cash registers. In this manner, the identification device automatically transmits data associated with the customer or vehicle and the system automatically carries out the financial aspects of the transaction such as payment for the purchase of goods or services, without requiring any special action by the customer or by the service station employee.

In the art, various methods, systems, and devices for automatic refueling of vehicles are known. These include wireless RF servers which communicate with devices located within fuel dispensers and with identification devices mounted on vehicles, such as disclosed in U.S. patent application Ser. No. 09/911,570 published as US 2003/0025600 A1, and systems for the management of fueling transactions, such as that of U.S. patent application Ser. No. 10/425,073 published as US 2004/0215575 A1. There are also known systems for ensuring the positioning of a vehicle relative to a fixed automatic fueling service terminal, such as that disclosed in U.S. patent application Ser. No. 10/298,160 published as US 2004/0095230 A1.

U.S. patent application Ser. No. 11/042,196 published as US 2005/0184155 A1 relates to a vehicle fueling system wherein the vehicle is provided with an RF identification tag mounted on the vehicle windshield and wherein the fueling station includes sensors for detecting the presence of the vehicle and reporting to a controller subsystem. The controller subsystem communicates with a point of sale system for processing a fueling transaction and activation of a fuel dispenser. It should be noted that this system does not include any physical interface to the fuel dispenser.

U.S. Pat. No. 5,857,501 discloses a system for fueling a vehicle which includes an identification unit having a communication loop and circuitry for transmitting information associated with the vehicle, such as identification number, credit account information, and fuel requirements. The unit is mounted on the fuel intake pipe of the vehicle and communicates with a data receiver located proximal to the fuel dispensing station. In order to secure the unit to the fuel intake pipe of the vehicle, the device requires a housing assembly having a series of tabs and a ratchet type assembly, and a tool is used to advance the ratchet assembly such that the housing assembly is tightened against the interior of the fuel intake pipe. An alternative embodiment of the invention requires a housing assembly having a series of compression activated expansion joints which are expanded by the tightening of screws such that the housing assembly is tightened against the interior of the fuel intake pipe.

U.S. Pat. No. 6,648,032 relates to a fuel distribution system wherein there is provided a nozzle-mounted device which receives information, such as vehicle identification and fueling data, from a vehicle-mounted transceiver prior to discharge of fuel into the vehicle. The device communicates with an authorization subsystem located at the fuel filling facility. The vehicle-mounted transceiver is located on an inner surface of the vehicle chassis and includes an antenna for transmitting information to the nozzle-mounted device. The device also includes a fuel flow driven transceiver power generator operated by fuel pumped by the fuel pump that passes through the fuel nozzle.

U.S. Pat. No. 6,900,719 B2 discloses an anti-theft device that provides protection for an identification device utilized in a vehicle refueling system. The anti-theft device comprises a plug that retains an electrical chip having a unique identification number for the vehicle, the plug being inserted into a bore in the body of the vehicle. The chip must be programmed and the plug must be installed on the vehicle body by the vehicle manufacturer. The chip is electrically connected to a controller portion of the system by an electrical connection installed at the fuel inlet of the vehicle. Removal of the identification device from the body of the vehicle will disable the controller portion of the system, such that the device provides anti-theft protection for the vehicle identification chip.

While known systems for automatic refueling of vehicles enable the identification of authorized vehicles and their subsequent refueling, prior art systems require professional installation due to the fact that they contain complicated means for mounting the identification devices on the vehicle.

It would be highly advantageous to have a system for refueling an authorized vehicle that would overcome at least some of the disadvantages of the prior art. Preferably, such a system would include a vehicle identification device that is inexpensive to produce and is simple to install on the vehicle. Such a system would also preferably include an interface with the vehicle odometer, such that various data relating to operation of the vehicle and vehicle fuel consumption may be determined and communicated.

SUMMARY OF THE INVENTION

The present invention is of systems and methods, embodiments of which address at least some of the shortcomings of the prior art in the field of authorizing purchases associated with vehicles.

According to the teachings of the present invention there is provided a system for authorizing purchases associated with a vehicle comprising: an identification tag associated with the vehicle for storing tag data associated with the vehicle; a data storage device associated with the vehicle for storing vehicular data and configured to transmit the vehicular data (and in embodiments to function as a second identification tag); at least one tag reader configured to read and transmit the tag data; and a station relay unit configured to receive the transmitted vehicular data and the transmitted tag data and to transmit an authorization signal.

In embodiments of the present invention, the identification tag is fixed on the vehicle for example proximal to a fuel inlet of the vehicle.

In embodiments of the present invention, the identification tag is an active device configured to transmit the tag data to the tag reader.

In embodiments of the present invention, the identification tag is a passive device, e.g. an RFID device, configured to allow reading of the tag data by the tag reader.

In embodiments of the present invention, the identification tag is read-only. In embodiments of the present invention, the identification tag is rewritable.

Typical data stored by the identification tag includes, but is not limited to, data such as the identity of the identification tag, identity of the data storage device, a vehicle identification number, a vehicle user identification number, a serial identification number, a client identification number, payment information, credit account information, credit rating information, offline credit rating information, vehicle particulars, fuel tank capacity, fuel supply policy, fraud information, and required fuel particulars for the vehicle.

In embodiments of the present invention, the tag data is rendered unreadable upon detachment of the identification tag from the vehicle as taught, for example, in Applicant's copending PCT patent application identified by attorney docket number 32619.

In embodiments of the present invention, the data storage device is configured to receive communication from the station relay unit, and to transmit the vehicular data upon receipt of the communication from the station relay unit.

In embodiments of the present invention, the vehicular data includes an identity of the data storage device. In embodiments, the vehicular data includes data such as the identity of the data storage device, identity of the identification tag, a vehicle identification number, a vehicle user identification number, a serial identification number, a client identification number, payment information, credit account information, credit rating information, offline credit rating information, vehicle particulars, fuel tank capacity, fuel supply policy, fraud information, required fuel particulars for the vehicle, and measured data relating to driver operation of the vehicle such as distance traveled, vehicle position, vehicle acceleration, vehicle speed and vehicle turning rate.

In embodiments of the present invention, the vehicular data includes data related to driver operation of the vehicle.

In embodiments of the present invention, the vehicular data includes data relating to the distance traveled by the vehicle. In embodiments, the data storage device is configured to receive data relating to distance traveled by the vehicle from the vehicle odometer.

In embodiments of the present invention, the vehicular data includes data relating to the location of the vehicle. In embodiments of the present invention, the system includes a vehicle position determining device associated with the vehicle, that is configured to provide data relating to vehicle position to the data storage device.

In embodiments of the present invention, the vehicular data includes data relating to acceleration of the vehicle. In embodiments of the present invention, the system includes an accelerometer associated with the vehicle, configured to provide data relating to vehicle acceleration to the data storage device.

In embodiments of the present invention, the vehicular data includes data relating to the speed of the vehicle. In embodiments of the present invention, the system includes a tachometer associated with the vehicle, configured to provide data relating to vehicle speed to the data storage device.

In embodiments of the present invention, the vehicular data includes data relating to the turning rate of the vehicle. In embodiments of the present invention, the system includes a turning rate meter (e.g., a G-force meter) associated with the vehicle, configured to provide data relating to rate of vehicle turning to the data storage device.

In embodiments of the present invention, the data storage device further comprises a passive device (e.g., an RFID device) configured to allow reading of auxiliary data stored thereon. In embodiments of the present invention, the passive device is read-only. In embodiments of the present invention, the passive device is rewritable. Typical auxiliary data includes, but is not limited to, at least one member of the group consisting of identity of the identification tag, identity of the data storage device, a vehicle identification number, a vehicle user identification number, a serial identification number, a client identification number, payment information, credit account information, credit rating information, offline credit rating information, vehicle particulars, fuel tank capacity, fuel supply policy, fraud information, and required fuel particulars for the vehicle.

In embodiments of the present invention, the data storage device includes an autonomous power source. In embodiments of the present invention, the data storage device receives power from the vehicle.

In embodiments of the present invention, the data storage device includes a continuously running timer and is configured to record output of the timer.

In embodiments of the present invention, the tag reader is configured to read the tag data from a distance of no more than 50 cm.

In embodiments of the present invention, the tag reader comprises a wireless transmitter to transmit the tag data to the station relay unit. In embodiments of the present invention, the tag reader comprises a wireless transceiver to receive communication from the station relay unit.

In embodiments of the present invention, the tag reader is configured to transmit the tag data to a distance of up to approximately 150 meters.

In embodiments of the present invention, the tag reader is configured to transmit a substantially unique tag reader identifier.

In embodiments of the present invention, the tag reader is configured to receive the transmitted vehicular data and to retransmit the transmitted vehicular data.

In embodiments of the present invention, the tag reader has at least two modes: a first, idle mode to reduce energy use and a second, active mode wherein the tag reader is operable to read the tag data. In embodiments of the present invention, the tag reader includes a tag reader controller for switching the tag reader between the idle mode and the active mode. In embodiments of the present invention, the tag reader is configured to periodically enter the active mode, e.g., between about every 0.1 second and every 10 seconds. In embodiments of the present invention, the tag reader is associated with a fuel dispenser outlet, and the tag reader is configured to enter the active mode upon manipulation of the fuel dispenser outlet.

In embodiments of the present invention, the tag reader includes an autonomous power source. In embodiments of the present invention, the tag reader is configured to determine a capacity of the autonomous power source. In embodiments of the present invention, upon the determination of a capacity below a predetermined minimum, the tag reader transmits a signal to the station relay unit indicating such. In embodiments of the present invention, the autonomous power source is rechargeable. In embodiments of the present invention, the autonomous power source comprises a battery.

In embodiments of the present invention, the tag reader is associated with a fuel dispenser. In embodiments of the present invention, components of the tag reader are located in proximity of a fuel dispensing nozzle of the fuel dispenser. In embodiments of the present invention, the tag reader is configured to read the tag data when the fuel dispensing nozzle engages a fuel inlet of the vehicle. In embodiments of the present invention, the tag reader is associated with a fuel dispenser outlet and the system further comprises a fuel inlet sensor for sensing when the fuel dispenser outlet engages a fuel inlet of the vehicle.

In embodiments of the present invention, the tag reader includes an autonomous power source. In embodiments of the present invention, the autonomous power source comprises a dynamo. In embodiments of the present invention, the dynamo produces electrical power from flow of fuel. In embodiments of the present invention, the dynamo produces electrical power from movement of a fuel-dispensing nozzle. In embodiments of the present invention, the dynamo produces electrical power from movement of a fuel dispenser actuation device of a fuel-dispensing nozzle. Such power sources are taught, for example, in Applicant's copending PCT patent application identified by attorney docket number 32619.

In embodiments of the present invention, the system further comprises a portable identification tag associated with the vehicle, for storing tag data associated with the vehicle. In embodiments of the present invention, the portable identification tag is read-only. In embodiments of the present invention, the portable identification tag is rewritable. In embodiments of the present invention, the portable identification tag is an active device configured to transmit the tag data. In embodiments of the present invention, the portable identification tag is a passive device (e.g., an RFID device) configured to allow reading of the tag data by the tag reader. In embodiments of the present invention, the portable identification tag is configured as a magnetic card. In embodiments of the present invention, the portable identification tag is configured as a smart card. In embodiments of the present invention, the portable identification tag is associated with a cellular telephone.

In embodiments of the present invention, the secondary tag reader is configured to read the tag data from the portable identification tag and transmit the tag data to the station relay unit.

In embodiments of the present invention, the secondary tag reader is further configured to receive an authorization signal and, upon receipt of the authorization signal, to authorize purchase of goods and services In embodiments of the present invention, the transmission by the secondary tag reader to the station relay unit is wireless.

In embodiments of the present invention, the transmission by the secondary tag reader to the station relay unit is wired.

In embodiments of the present invention, the system further comprises a retransmitter to relay communication between the tag reader and the station relay unit.

In embodiments of the present invention, the system further comprises a retransmitter to relay communication between the data storage device and the station relay unit.

In embodiments of the present invention, the station relay unit includes a computer.

In embodiments of the present invention, the system further comprises a central control device in communication with the station relay unit, storing information associated with the vehicle, the central control device configured to receive and store the tag data and the vehicular data from the station relay unit, and based upon the received tag data, the received vehicular data and the stored information, to optionally instruct the station relay unit to transmit the authorization signal.

In embodiments of the present invention, the station relay unit is configured to transmit purchase data to the central control device and the central control device is configured to store the purchase data as part of the information associated with the vehicle. In embodiments of the present invention, the final purchase data includes data such as volume of fuel dispensed, price of fuel, purchase price, date of fuel dispensing, time of fuel dispensing and non-fuel products purchased.

In embodiments of the present invention, the central control device functions as a server for the system.

In embodiments of the present invention, the information associated with the vehicle stored in the central control device includes at least one member of the group consisting of vehicle identity, required fuel particulars, payment means, credit rating and other accounting information, identity of the data storage device, identity of the identification tag, identity of a portable identification tag, special conditions and warnings, historical fuel usage and historical purchase patterns.

In embodiments of the present invention, the communication between the station relay unit and the central control device includes a TCP/IP connection.

In embodiments of the present invention, the central control device is located remotely from the station relay unit.

In embodiments of the present invention, the central control device is configured to determine a match between the tag data and the vehicular data.

According to the teachings of the present invention, there is also provided a method of authorizing a purchase associated with a vehicle, comprising: a) associating a vehicle with a first identifier and a second identifier and storing the association with the first identifier and the second identifier in a record; b) when requested to authorize a purchase associated with the vehicle at a venue, acquiring a first identifier and a second identifier from the vehicle; c) determining an association of the acquired first identifier with the acquired second identifier with reference to the record using a comparator; and d) if the first acquired identifier and the second acquired identifier are associated, authorizing the purchase.

In embodiments of the present invention, if the first acquired identifier and the second acquired identifier are not associated, the purchase is not authorized.

In embodiments of the present invention, the second identifier is actively transmitted from the vehicle to the comparator.

In embodiments of the present invention, the first identifier is stored in a passive device and is read from the passive device using a tag reader located at the venue, and is subsequently transmitted to the comparator.

In embodiments of the present invention, components of the tag reader are associated with a fuel dispensing nozzle and the reading of the first identifier is during the process of refueling the vehicle.

In embodiments of the present invention, the second identifier is actively transmitted from the vehicle, acquired by the tag reader, and subsequently transmitted to a comparator.

In embodiments of the present invention, the method further comprises e) recording driving behavior of a driver of the vehicle; f) storing the recorded driving behavior; and g) basing authorization of the purchase also on the recorded driving behavior.

In embodiments of the present invention, the recorded driving behavior includes at least one parameter selected from the group consisting of location at which the vehicle was driven, a velocity at which the vehicle was driven, acceleration of the vehicle, deceleration of the vehicle, a turn rate of the vehicle, a fuel usage profile of the vehicle and a distance over which the vehicle was driven.

According to the teachings of the present invention there is also provided a method of selling merchandise (that is goods and services, including for example fuel) at a fuel-dispensing station comprising: a) to each client, i) providing a first identification tag affixed to a vehicle; ii) providing a second identification tag; and iii) maintaining a record associating the first identification tag, the second identification tag and a payment mechanism; and b) when a person desires to purchase fuel for a vehicle, iv) determining the identity of a first identification tag affixed to the vehicle and a second tag presented by the person; v) by examining the record, ascertaining if the affixed first identification tag and the presented second tag are associated; and vi) if the affixed first identification tag and the presented second tag are associated, authorizing the purchase of the fuel by the person and debiting the payment mechanism.

In embodiments, c) a client is provided with a portable third identification tag and a record is maintained associating the portable third identification tag with the affixed first identification tag, the second identification tag and the payment mechanism; and d) when a person desires to purchase non-fuel merchandise, vii) determining the identity of a portable third identification tag presented by the person and a second tag presented by the person; viii) by examining the record, ascertaining if the presented portable third tag and the presented second tag are associated; and ix) if the presented portable third tag and the presented second tag are associated, authorizing the purchase of the merchandise by the person and debiting the payment mechanism.

In embodiments, c) a client is provided with a portable third identification tag and a record is maintained associating the portable third identification tag with the affixed first identification tag, the second identification tag and the payment mechanism; and d) when a person desires to purchase non-fuel merchandise, vii) determining the identity of a first identification tag affixed to a vehicle associated with the person, determining the identity of a portable third identification tag presented by the person and of a second identification tag presented by the person; viii) by examining the record, ascertaining if the presented portable third identification tag, the affixed first identification tag and the presented second tag are associated; and ix) if the affixed first identification tag, the presented portable third tag and the presented second tag are associated, authorizing the purchase of the merchandise by the person and debiting the payment mechanism.

In embodiments, the first identification tags provided to the clients are substantially irremovably affixed to the vehicle as taught, for example, in Applicant's co-pending PCT patent application identified by attorney docket number 32619.

In embodiments, the first identification tags provided to the clients are affixed in proximity to a fuel inlet (e.g., a refueling port) of a vehicle and determining the identity of a presented affixed first identification tag comprises using a tag reader configured to determine the identity of an affixed first identification tag when a fuel dispensing nozzle is engaged to dispense fuel through that fuel inlet of a vehicle. In embodiments, components of the tag reader are physically associated with the fuel dispensing nozzle.

In embodiments, the first identification tags provided to the clients are passive devices, e.g., RFID tags.

In embodiments, the second identification tags provided to the clients are configured to transmit data relating to use of a vehicle recorded by a meter device. In embodiments, second identification tags provided to the clients comprise a wireless transmitter.

In embodiments, determination of the identity of a presented second identification tag occurs when the second identification tag is in the immediate proximity of a vehicle. In embodiments, the determination of the identity of the presented second identification tag occurs only when the vehicle is in the fuel-dispensing station.

BRIEF DESCRIPTION OF THE DRAWINGS

The invention is herein described, by way of example only, with reference to the accompanying drawing. With specific reference now to the drawing in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawing making apparent to those skilled in the art how the several forms of the invention may be embodied in practice.

In the drawing:

FIG. 1 is a schematic depiction of a top view of a service station equipped with a system of the present invention.

DESCRIPTION OF EMBODIMENTS OF THE INVENTION

The present invention is of a system and method for authorizing purchases associated with a vehicle.

The principles, uses and implementations of the teachings of the present invention may be better understood with reference to the accompanying description and FIGURE. Upon perusal of the description and FIGURE present herein, one skilled in the art is able to implement the teachings of the present invention without undue effort or experimentation.

Before explaining at least one embodiment of the invention in detail, it is to be understood that the invention is not limited in its application to the details set forth herein. The invention can be implemented with other embodiments and can be practiced or carried out in various ways. It is also understood that the phraseology and terminology employed herein is for descriptive purpose and should not be regarded as limiting.

Generally, the nomenclature used herein and the laboratory procedures utilized in the present invention include techniques from the fields of computer science, commerce, material sciences and engineering. Such techniques are thoroughly explained in the literature. Unless otherwise defined, all technical and scientific terms used herein have the same meaning as commonly understood by one of ordinary skill in the art to which the invention belongs. In addition, the descriptions, materials, methods and examples are illustrative only and not intended to be limiting. Methods and materials similar or equivalent to those described herein can be used in the practice or testing of the present invention. All publications, patent applications, patents and other references mentioned are incorporated by reference in their entirety as if fully set forth herein. In case of conflict, the terms are to be understood as used in the specification.

As used herein, the terms "comprising" and "including" or grammatical variants thereof are to be taken as specifying the stated features, integers, steps or components but do not preclude the addition of one or more additional features, integers, steps, components or groups thereof. These terms encompass the terms "consisting of" and "consisting essentially of".

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

The term "method" refers to manners, means, techniques and procedures for accomplishing a given task including, but not limited to, those manners, means, techniques and procedures either known to, or readily developed from known manners, means, techniques and procedures by practitioners of the relevant arts. Implementation of the methods of the present invention involves performing or completing selected tasks or steps manually, automatically, or a combination thereof.

Herein, the term "passive device" refers to a device that stores data (whether read-only or rewritable) that does not have an own power source. The term encompasses such devices as bar codes. The term also encompasses data storage devices that receive an amount of power from a reader by induction and then use the received power to transmit the data, such as RFID tags and circuits.

Herein, the term "active device" refers to a device associated with a power source that stores data (whether read-only or rewritable) where the device is configured to transmit the data using power from the associated power source.

Herein, the term "fuel dispenser" refers to a device that dispenses fuel, for example to a vehicle, and generally includes a pump, at least one hose and at least one fuel-dispensing nozzle with a fuel dispensing actuator such as a trigger.

The method of the present invention for authorizing purchases associated with a vehicle may be implemented with a variety of devices and systems. Preferably, the method of the present invention is implemented using a system of the present invention. For ease of explanation, an embodiment of the method of the present invention will be described herein with reference to an embodiment of the system of the present invention, schematically depicted in FIG. 1.

A top-view of a service station 10 provided with a system of the present invention is schematically depicted in FIG. 1 where various components are not depicted to scale. Service station 10 includes a station building 12 selling non-fuel products from a store 14. Service station 10 also includes one refueling pier 16 with three fuel-dispensing locations 18a, 18b and 18c (fuel dispensers) and a non-fuel product dispenser 20. Service station 10 is in communication (e.g., combination of prior art wired and wireless communication such as telephone, internet, cable, fiber optic and/or microwave communication) with a remote billing service organization 22.

Two vehicles, 24a and 24b are located at refueling pier 16 in proximity to fuel-dispensers 18a and 18b, respectively, with fuel-dispensing nozzles 26a and 26b, respectively, in the respective fuel inlets. A person 28a, associated with vehicle 24a is seen in station building 12 purchasing goods at store 14. A person 28b, associated with vehicle 24b is seen in proximity of non-fuel product dispenser 20 purchasing goods therefrom.

Generally, fuel or other goods or services are purchased by a person associated with a vehicle 24. The system of the present invention gathers data from a vehicle 24 and transmits the data to a central control device 46 located at the remote billing service organization 22 via a station relay unit 40 found in station building 12. Central control device 46 compares the received data to stored information relating to the vehicle. If the results of the comparison are positive, that is that data gathered from vehicle 24 matches information stored, central control device 46 issues an authorization signal to station relay unit 40 allowing the purchase. Generally billing and payment are performed automatically by central control device 46 in a manner as known in the art.

Generally, components of a system of the present invention are of two types: vehicle associated components and service station associated components.

Both vehicle 24a and vehicle 24b are provided with vehicle-associated components of a system of the present invention: an identification tag 30, a data storage device 32 and a portable identification tag 29.

An identification tag 30 of a system of the present invention is associated with a vehicle 24 and stores tag data associated with that vehicle such as vehicle identification, vehicle user identification number, a serial identification number, a client identification number, payment information, credit account information and required fuel particulars for the vehicle. Generally, an identification tag 30 is fixed to a respective vehicle 24, for example, on the windshield, tail pipe or dashboard. Preferably, an identification tag 30 is fixed proximal to a fuel inlet of a vehicle 24, as is known in the art. An identification tag 30 is fixed to a vehicle 24 using any suitable method, for example, by friction or the use of clamps, screws or adhesives.

In embodiments of the present invention, an identification tag of a system of the present invention is active, that is to say, configured to transmit (preferably wirelessly) stored tag data. In embodiments, such as depicted in FIG. 1, identification tag 30a associated with vehicle 24a is a passive identification tag, that is, does not transmit tag data but is configured to allow another device to read the tag data stored therein. For example, in embodiments passive identification tag 30a is an RFID device configured to be read by an external tag reader. A suitable RFID device includes an integrated circuit for example a Picopass memory chip from Inside Contactless (Aix en Provence, France) or an EM4094 integrated circuit from EM Microelectronic (Marin, Switzerland).

Identification tag 30a is mounted proximal to the fuel inlet of vehicle 24a, under the fuel inlet cover, with adhesive. To avoid theft and illegitimate use, identification tag 30a is configured to be erasable so that stored tag data is substantially erased upon detachment of identification tag 30a from vehicle 24a.

A data storage device 32 of a system of the present invention is associated with a vehicle 24 and configured to receive and store vehicular data associated with operation of that vehicle and preferably driver operation of vehicle 24. To this end, data storage device 32 is provided with a memory (e.g., flash memory from M-Systems Ltd., Kfar Saba, Israel). A data storage device 32 of a system of the present invention is further configured to transmit (preferably wirelessly) the vehicular data as well as a substantially unique data storage device identifier. As is discussed hereinbelow, transmission of the vehicular data is to a station relay unit 40, whether directly or through a relay such as a tag reader (34, 36 or 38) or through a retransmitter 42. To this end, data storage device 32 is provided with a transmitter or a transceiver, for example, operating in the ISM band (433 MHz). In embodiments, data storage device 32 includes a transceiver and transmits upon receipt of instructions from station relay unit 40.

In embodiments, data storage device 32 is attached closely to or includes identification tag 30. In embodiments, data storage device 32 is attached to vehicle 24 remotely from identification tag 30, for example, is attached under the bonnet of vehicle 24. As discussed hereinbelow, a data storage device 32 provides additional security to prevent theft and abuse of a system of the present invention and also allows monitoring of driver behavior.

Data storage device 32 is configured to record and store information from vehicle 24, from detection and measuring instruments installed in vehicle 24, or from detection and measuring instruments installed in or associated with data storage device 32.

In embodiments, a vehicle 24 is provided with an odometer that provides vehicular data relating to distance traveled by a vehicle 24 to data storage device 32. Such an odometer can be the odometer with which every standard vehicle 24 is equipped which transfers the data to data storage device 32, for example, through a standard data transfer connector such as a CAN bus, or a dedicated odometer especially configured to provide the data to data storage device 32.

In embodiments, vehicle 24 and/or data storage device 32 is provided with a position-determining device to provide vehicular data relating to the position of vehicle 24 to data storage device 32. A suitable position-determining device includes, for example, a GPS receiver or a device which is configured to determine the vehicle position from a local positioning network such as based on cellular telephone technology.

In embodiments, vehicle 24 and/or data storage device 32 is provided with an accelerometer to provide vehicular data relating to the rate of acceleration and deceleration of vehicle 24 to data storage device 32. Acceleration and deceleration rates provide insight into the behavior and skill of the driver operating vehicle 24.

In embodiments, vehicle 24 and/or data storage device 32 is provided with a tachometer to provide vehicular data relating to the velocity of vehicle 24 to data storage device 32. The speed with which a vehicle is driven provides insight into the behavior and skill of the driver operating vehicle 24.

In embodiments, vehicle 24 and/or data storage device 32 is provided with a G-force meter to provide vehicular data relating to the rate of vehicle turning of vehicle 24 to data storage device 32. The rate of vehicle turning provides insight into the behavior and skill of the driver operating vehicle 24.

In embodiments, vehicular data is provided to and recorded by data storage device 32 by some or all of the various instruments continuously. In embodiments, vehicular data is provided to and recorded by data storage device 32 by some or all of the various instruments intermittently. In embodiments, vehicular data is provided to and recorded by data storage device 32 by some or all of the various instruments only under certain conditions, for example, vehicular data indicative of dangerous driver behavior such as excessive speed.

In embodiments, data storage device 32 is physically attached, for example by cables, to some or all of the instruments. In such embodiments, data storage device 32 records instances where a cable or the like is disconnected recording tampering events or technical problems. In embodiments, data storage device 32 is in wireless communication with some or all of the instruments. In such embodiments, data storage device 32 records instances where an instrument is not in communication with data storage device 32 to record tampering events or technical problems. In embodiments, a data storage device 32 is provided with a continuous timer and is configured to continuously or intermittently record timer output to record tampering events or technical problems such as power failure.

In embodiments, data storage device 32 is provided with an autonomous power source, for example, a battery or other autonomous power source. In embodiments, data storage device 32 receives power from vehicle 24. In embodiments, data storage device 32 is provided with an autonomous power source that is rechargeable, for example, by receiving power from vehicle 24 or from an associated solar energy cell.

In embodiments, data storage device 32 is entirely autonomous, that is to say is substantially a closed unit, including an autonomous power source and including autonomous and preferably internally contained detection measuring instruments. As such embodiments are not dependent on any physical connection for ordinary functioning, such embodiments may be mounted anywhere in vehicle 24, for example in the passenger compartment or attached to the windshield.

In embodiments, a data storage device 32 is disabled by and/or records tampering attempts.

In embodiments, a system of the present invention further comprises a portable identification tag 29 associated with a vehicle 24 for storing tag data associated with vehicle 24. Tag data stored on a portable identification tag 29 is substantially similar or identical to tag data stored on an associated identification tag 30. Portable identification tag 29 allows for secure and authorized purchase associated with a vehicle of non-fuel goods and services remote from a fuel dispenser 18 but within the bounds of a service station 10, for example, at a store 14 or at a non-fuel product dispenser 20. As detailed below, the use of portable identification tag 29 allows for purchase of goods and services during the time when vehicle 24 is being refueled.

As apparent from the term, portable identification tag 29 is portable and is carried from vehicle 24 with which associated. In embodiments, portable identification tags 29 of the present invention are implemented as magnetic cards, smart cards or RFID devices, carried, for instance, in a wallet or purse or on a key chain.

In FIG. 1, a person 28a associated with vehicle 24a holds a portable identification tag 29a while a person 28b associated with vehicle 24b holds a portable identification tag 29b.

In FIG. 1, service station 10 is provided with a number of service station associated components of a system of the present invention: tag readers 34 associated with fuel-dispensing nozzles 26 of fuel dispensers 18; a secondary tag reader 36 associated with non-fuel product dispenser 20, a secondary tag reader 38 associated with store 14, retransmitter 42 and a station relay unit 40.

Generally, any of tag readers 34, 36 or 38 is configured to read tag data from an identification tag 29 or 30 and to transmit the read tag data to station relay unit 40, as discussed below. Specifically, tag readers 34 are configured to read tag data from an identification tag 30 for the purpose of facilitating the purchase of fuel from a fuel dispenser 18 whereas tag readers 36 and 38 are configured to read tag data from a portable identification tag 29 for the purpose of facilitating the purchase of goods and services from store 14 or non-fuel product dispenser 20.

In embodiments, a tag reader is configured to read tag data from a short distance, that is, a distance of no more than about 50 cm, no more than about 20 cm, no more than about 10 cm, no more than about 5 cm and even no more than about 1 cm.

In embodiments, a tag reader 34, 36 or 38 is configured to transmit read tag data to station relay unit 40 non-wirelessly, that is, over a physical connection such as a cable or the like.

In embodiments, a tag reader 34, 36 or 38 comprises a wireless transmitter to wirelessly transmit read tag data to station relay unit 40. In embodiments, a tag reader comprises a wireless transceiver, allowing two-way communication with station relay unit 40. In embodiments, a tag reader 36, 38 and especially 34 comprises a wireless transceiver, allowing tag reader 34 to act as a relay to receive vehicular data transmitted from data storage device 32 and to retransmit the vehicular data to station relay unit 40. Preferably, a wireless tag reader 34, 36 or 38 is configured to transmit the read tag data (or to retransmit received vehicular data) throughout a service station 10, typically up to about 150 meters. Suitable transceivers for use in implementing a tag reader of the present invention include NanoNET TRX transceivers from Nanotron Technologies (Berlin, Germany) or IA4421 from Integration Associates (Mountain View, Calif.).

In embodiments, a tag reader 34, 36 or 38 is further configured to transmit a substantially unique tag reader identifier to station relay unit 40.

In embodiments, a tag reader has at least two modes: a first, idle mode to reduce energy use and a second, active mode wherein the tag reader is operable to read tag data, and also to transmit read tag data to a station relay unit. In embodiments, a tag reader includes a tag reader controller (not shown) for switching the tag reader between idle mode and active mode. Suitable controllers include a H8/38076R from Renesas Technology Corporation (Tokyo, Japan). In embodiments, a given tag reader periodically enters an active mode, for example, between about every 0.1 second and every 10 seconds, or between every 0.5 seconds and every 5 seconds. In embodiments where a tag reader is associated with a fuel dispenser outlet, the tag reader is configured to enter the active mode upon manipulation of the fuel dispenser outlet, for example, when the fuel-dispensing nozzle is removed from a respective cradle.

In embodiments, a tag reader includes an autonomous power source. In embodiments, the autonomous power source comprises a battery. In embodiments, a tag reader is configured to determine the remaining capacity of an autonomous power source and, upon determining that the remaining capacity is below a predetermined minimum, the tag reader transmits a signal to the station relay unit indicating such. In such a way, a service station worker has sufficient time to replace worn out power sources. In embodiments, an autonomous power source of a tag reader is rechargeable, for example by use of an induction current or by an associated solar energy cell.

As noted above, tag reader 34 is configured to read tag data from identification tag 30 for the purpose of facilitating the purchase of fuel from a fuel dispenser 18. Generally, tag reader 34 is associated with fuel dispenser 18. In embodiments, components of tag reader 34 are located in proximity of fuel-dispensing nozzle 26 of fuel dispenser 18 allowing tag reader 34 to be easily configured to read the tag data from identification tag 30 positioned in proximity of a fuel inlet of vehicle 24 when the fuel dispensing nozzle 26 engages the fuel inlet. In embodiments, tag reader 34 is provided with a fuel inlet sensor (not shown) for sensing when fuel dispenser nozzle 26 engages a fuel inlet of vehicle 24.

In general, tag reader 34 is a device that is attached to and is generally retrofit to a fuel dispenser nozzle 26. As a result, a tag reader 34 is preferably small so as to avoid interference with functioning of fuel dispenser nozzle 26. Further, a tag reader 34 is generally configured for wireless communications to avoid the necessity of cables that are difficult to install, may interfere with functioning of fuel dispenser nozzle 26 and may pose a safety hazard.

In embodiments, tag reader 34 includes an autonomous power source (not shown). In embodiments, the autonomous power source comprises a battery. In embodiments, an autonomous power source of tag reader 34 is rechargeable, for example by use of an induction current or by an associated solar energy cell. In embodiments, the autonomous power source of tag reader 34 comprises a dynamo (not shown), whether to recharge a battery or to power tag reader 34. In embodiments, the dynamo is configured to produce electrical power by the flow of fuel as is known in the art. In embodiments, the dynamo is configured to produce electrical power by the movement of fuel dispensing nozzle 26, for example, the shaking and moving as fuel dispensing nozzle 26 is removed from a respective cradle and mated with a fuel inlet of vehicle 24. In embodiments, the dynamo is configured to produce electrical power by the movement of a fuel dispenser actuation device (not shown) of a fuel-dispensing nozzle 26, for example, the pulling of the trigger of a standard fuel dispensing nozzle.

In embodiments, an authorization signal received to allow fuel dispensing is transmitted to fuel dispenser 18 directly as is known in the art. In embodiments, tag reader 34 is configured to activate a flow of fuel from fuel dispenser 18 and an authorization signal allowing fuel dispensing is received by tag reader 34 and, upon receipt of the authorization signal, activates the flow of fuel from fuel dispenser 18.

As noted above, secondary tag readers 36 and 38 are configured to read tag data from a portable identification tag 29 for the purpose of facilitating the purchase of goods and services from non-fuel product dispenser 20 and store 14, respectively. In embodiments, a secondary tag reader 36 or 38 is configured to read tag data from a portable identification tag 29 and to transmit the tag data to station relay unit 40. In embodiments, a secondary tag reader 36 or 38 is configured to receive an authorization signal and, upon receipt of the authorization signal, to authorize purchase of goods and services.

In general, secondary tag readers 36 and 38 are devices with configuration limitations that are more lenient than those of tag readers 34. Specifically, as discussed above, tag readers 34 are preferably retrofitted to a fuel-dispensing nozzle so are relatively small, relatively self-sufficient for power and preferably include a wireless transceiver while the fact that secondary tag readers 36 and 38 are generally associated with a large, immobile electronic device such as a cash register means that there are fewer design or configuration limitations.

A secondary tag reader 38 as depicted in FIG. 1 that is found inside station building 12 is optionally configured for wireless communication, but in embodiments is configured for wired communication. Further, a secondary tag reader 38 as depicted in FIG. 1 that is found inside station building 12 optionally comprises an autonomous power source, but in embodiments receives power from an external power source.

A secondary tag reader 36 as depicted in FIG. 1 associated with a non-fuel product dispenser 20 outside of station building 12 is optionally configured for wireless communication, but in embodiments is configured for wired communication. Generally, wireless communication is preferred as wires and cables may pose a safety hazard and are more difficult to retrofit. For similar reasons, although a secondary tag reader 36 as depicted in FIG. 1 associated with a non-fuel product dispenser 20 outside of station building 12 can be provided with an external power source, an autonomous power source is preferred.

For simplicity, for ease of installation and for reduced cost it is preferred that all tag readers 34, 36 and 38 communicate wirelessly directly with station relay unit 40. That said, in embodiments of the present invention, direct wireless communication is not convenient or not possible, for example, due to the size of service station 10, due to intervening structures such as reinforced concrete pillars, or due to a desire to reduce the size or power output of a given tag reader 34, 36 or 38. In such embodiments, a system includes one or more retransmitters 42 to relay communication between a tag reader and station relay unit 40. For example, in FIG. 1, retransmitter 42 relays communications from tag reader 34b to station relay unit 40, and, if necessary, from station relay unit 40 to tag reader 34b.

In embodiments a data storage device 32 is configured to communicate wirelessly directly with station relay unit 40. In embodiments, a data storage device 32 is configured to communicate wirelessly with station relay unit 40 through a tag reader 34, tag reader 34 acting as a retransmitter for communication from data storage device 32 to station relay unit 40 and, if necessary, from station relay unit 40 to data storage device 32. In embodiments, a system includes one or more retransmitters 42 to relay communication between a data storage device 32 and station relay unit 40. For example, in FIG. 1, retransmitter 42 relays communications from data storage device 32b to station relay unit 40 and, if necessary, from station relay unit 40 to data storage device 32b.

A system of the present invention generally includes a station relay unit 40. A station relay unit 40 acts as a go-between, receiving transmissions from other service station associated components of a system of the present invention and forwarding information required to receive an authorization signal from a central control device 46. A station relay unit 40 receives tag data read and transmitted by tag readers 34, 36 and 38, directly or through a retransmitter 42. A station relay unit 40 also receives vehicular data transmitted by data storage device 32, directly, via a tag reader 34, 36 or 38 or through a retransmitter 42. A station relay unit 40 is also configured to receive an authorization signal from central control device 46 and then to forward the authorization signal to an appropriate component of the system of the present invention. As noted above, for the purchase of fuel, in embodiments, an authorization signal is transmitted to an appropriate tag reader 34, configured to initiate the flow of fuel, or directly to a fuel dispenser 18. As noted above, for the purchase of goods and services other than fuel, in embodiments, an authorization signal is transmitted to an appropriate tag reader 36 or 38. As is discussed below, in embodiments a station relay unit 40 is also configured to generate an authorization signal under certain conditions.

In embodiments, subsequent to a purchase, station relay unit 40 is configured to transmit final purchase data to central control device 46 for storage by central control device 46 as part of the stored information associated with a given vehicle 24. Typical final purchase data transmitted and stored includes such data as a volume of fuel dispensed, a price of fuel, a purchase price, a date of fuel dispensing, a time of fuel dispensing and non-fuel products purchased.

A further component of embodiments of a system of the present invention is central control device 46, generally a computer that also functions as a server for the system of the present invention.

Central control device 46 is in communication with station relay unit 40 and is configured to store information associated with vehicles associated with the system of the present invention. Information stored by central control device 46 is generally in a database and includes, for each vehicle associated with the system, vehicle identity, required fuel particulars, payment means, credit rating and other accounting information, identity of any associated data storage device 32, identity of any associated identification tag 30, identity of any associated portable identification tag 29, special conditions and warnings, historical fuel usage, historical purchase patterns and the like. Central control device 46 is also configured to receive data from station relay unit 40 such as a list of vehicles present at station 10, identification tag 30 identity, portable identification tag 29 identity and/or data storage device 32 identity and, if the identities match, issues an authorization signal to station relay unit 40 or instructs station relay unit 40 to issue an authorization signal. In embodiments, central control device 46 is also configured to implement a "black-listing" policy including identifying suspect or illegitimate purchase or driving behavior, maintaining a "black list" and implementing policy decisions on members of the "black list".

In embodiments of the present invention, central control device 46 is local, that is, is physically located at service station 10. In embodiments, central control device 46 and station relay unit 40 are both substantially a single device performing the functions of both these components. In embodiments, central control device 46 is located at a location remote from service station 10 and from a plurality of other service stations. Communication between a service station 10 and central control device 46 is any suitable communication, wired or wireless. In embodiments, communication is via a TCP/IP connection. Preferably, for ease of installation, communication is through existing communication lines such as telephone, cable or Internet.

As is clear to one skilled in the art upon perusal of the description herein, the wireless communication network constituting part of a system of the present invention is implementable using many technologies and devices known in the art, including radio transmission and infrared communication. One such technology is the use of the Bluetooth protocol. The Bluetooth protocol has the advantage of being implementable with suitable commercially available components. That said, Bluetooth devices may have insufficient range for implementing the teachings of the present invention and the limited size of an individual Bluetooth piconet may render implementation of the present invention cumbersome. Although both issues of range and piconet size are easily overcome, for example, using relay hubs, embodiments of the present invention preferably include local custom-made networks of greater ranges with many members, based roughly, for example, on Bluetooth or cellular telephone network communication protocols.

The method of the present invention is a method of authorizing a purchase especially suited for purchases associated with a vehicle, such as performed in a service station, that take into account the particular characteristics of service stations and purchases performed therein. Such characteristics include the need for authorization and payment to be performed as quickly and efficiently as possible to save time and ensure high-throughput, the need to avoid theft of authorization device components and abuse thereof, and the need to allow purchase of goods and services other than fuel with equal ease. Further, the method of the present invention allows for the acquisition of information relating to driving behavior that is indicative of bad or dangerous driving and fuel theft, and to formulate and implement abuse prevention policies such as black-listing suspected thieves or bad drivers.

According to the present invention, a vehicle is associated with a first identifier and a second identifier. The association is stored in a record. When a request is made to authorize a purchase associated with the vehicle at a venue such as a service station, a first identifier and a second identifier are acquired from the vehicle. The acquired first identifier and acquired second identifier are then compared to the record to determine if these are associated. If the record indicates that the first acquired identifier and the second acquired identifier are associated, the purchase is authorized. If the record indicates that the first acquired identifier and the second acquired identifier are not associated, the purchase is not authorized.

In embodiments, the second identifier is actively transmitted from the vehicle to be acquired and sent to a comparator, for example a central control device 46 via a station relay unit 40 as described above.

In embodiments, the first identifier is a passive identifier that is not transmitted but is acquired by reading using a tag reader located at the venue, and is subsequently transmitted to the comparator. In embodiments, the second identifier is actively transmitted from the vehicle to be acquired by the tag reader and is subsequently transmitted to the comparator together with the first identifier.

In embodiments, components of the tag reader are associated with a fuel-dispensing nozzle and the acquisition of the first identifier is accomplished during a process of refueling the vehicle.

In embodiments, the second identifier is actively transmitted from the vehicle, acquired by the tag reader, and subsequently transmitted to the comparator.

In embodiments, the driving behavior of the driver of the vehicle is recorded, for example, where the vehicle was driven, the velocity at which the vehicle was driven, the acceleration of the vehicle, the deceleration of the vehicle, the turn rate of the vehicle, the fuel usage profile of the vehicle and the distance over which the vehicle was driven, and is stored and used also in part for determining whether a purchase is to be authorized. In a first embodiment of the method of the present invention, a data storage device 32a communicates directly with a station relay unit 40 as discussed with reference to a device of the present invention, as a vehicle 24a enters a service station 10. A person 28a places fuel dispensing nozzle 26a inside the fuel inlet port of vehicle 24a, pulls the trigger of fuel dispensing nozzle 26a and walks to store 14 in station building 12.

When fuel dispensing nozzle 26a engages the fuel inlet port, tag reader 34a enters active mode, reading tag data from identification tag 30a. Tag reader 34a transmits a tag reader identification number and tag data from identification tag 30a to station relay unit 40.

Station relay unit 40 transmits a query to data storage device 32a. Data storage device 32a responds by sending a data storage device identifier and stored vehicular data to station relay unit 40. Station relay unit 40 stores a data storage device identifier in a list of data storage devices 32 currently in service station 10. In embodiments, central control device 46 stores a data storage device identifier in a list of data storage devices 32 currently in service station 10.

Station relay unit 40 transmits tag data from identification tag 30a, the list of data storage devices 32 currently in service station 10 including the identifier of data storage device 32a and received vehicular data to central control device 46.

Central control device 46 stores received vehicular data in a field associated with the identifier of data storage device 32a and checks if both data storage device 32a and tag data from identification tag 30a are recorded as being associated with the same vehicle, and if the vehicle is authorized to receive fuel.

If authorized, central control device 46 instructs station relay unit 40 to issue an authorization signal.

Station relay unit 40 receives the instruction and transmits an authorization signal to fuel dispenser 18a that provides fuel to vehicle 24a.

When the dispensing of fuel is complete, the amount of the fuel provided to vehicle 24a, a price of the fuel dispensed and a purchase price are transmitted via station relay unit 40 to central control device 46 for storage.

During the above process, person 28a enters station building 12 and requests to purchase goods at store 14 by a process including presenting portable identification tag 29a so as to be read by secondary tag reader 38.

Secondary tag reader 38 reads tag data from portable identification tag 29a and transmits the read tag data to station relay unit 40. As data storage device 32a is already registered with station relay unit 40, station relay unit 40 transmits tag data from portable identification tag 29a read by secondary tag reader 38 and the identifier of data storage device 32a to central control device 46.

Central control device 46 checks if both data storage device 32a and tag data from portable identification tag 29a are recorded as being associated with the same vehicle, and if the vehicle is authorized to receive the requested goods and services from store 14.

If authorized, central control device 46 instructs station relay unit 40 to issue an authorization signal to store 14 and/or to secondary tag reader 38.

When the acquisition of requested goods and services is complete, the price of the goods and services and a price of the purchase at store 14 are transmitted via station relay unit 40 to central control device 46 for storage.

In a second embodiment of the method of the present invention, a data storage device 32b communicates with a station relay unit 40 via a tag reader 34b as discussed with reference to a device of the present invention, as a vehicle 24b enters a service station 10. A person 28b places fuel dispensing nozzle 26b inside the fuel inlet port of vehicle 24b, pulls the trigger of fuel dispensing nozzle 26b and walks to non-fuel product dispenser 20 on pier 16.

Tag reader 34b is configured to enter active mode every 5 seconds and to seek a nearby identification tag 30. As a result, within five seconds of fuel dispensing nozzle 26b engaging the fuel inlet port, tag reader 34b enters active mode reading tag data from identification tag 30b.

Upon reading tag data from identification tag 30b, tag reader 34b sends a query to data storage device 32b which responds by sending an identifier to tag reader 34b.

Tag reader 34b transmits a tag reader identification number, tag data from identification tag 30b and the identifier of data storage device 32b to station relay unit 40 via retransmitter 42.

Station relay unit 40 transmits tag data from identification tag 30b and the identifier of data storage device 32b to central control device 46.

Central control device 46 checks if both data storage device 32b and tag data from identification tag 30b are recorded as being associated with the same vehicle, and if the vehicle is authorized to receive fuel.

If authorized, central control device 46 instructs station relay unit 40 to issue an authorization signal and to request vehicular data from data storage device 32b.

Station relay unit 40 receives the instruction and transmits an authorization signal to fuel dispenser 18b that provides fuel to vehicle 24b. Station relay unit 40 also transmits a request to tag reader 34b to request stored vehicular data from data storage device 32b.

Tag reader 34b instructs data storage device 32b to transmit stored vehicular data. As data storage device 32b transmits the stored vehicular data, tag reader 34b receives and retransmits the vehicular data to station relay unit 40 via retransmitter 42.

Station relay unit 40 receives the vehicular data from data storage device 32b and transmits the data to central control device 46 which stores the received vehicular data in a field associated with the identifier of data storage device 32b.

When the dispensing of fuel is complete, the amount of the fuel provided to vehicle 24b, a price of the fuel dispensed and a purchase price are received by station relay unit 40 from fuel dispenser 18b and transmitted by station relay unit 40 to central control device 46 for storage. During the above process, person 28b approaches non-fuel product dispenser 20 and selects goods and services to purchase therefrom by a process including presenting portable identification tag 29b so as to be read by secondary tag reader 36.

Secondary tag reader 36 reads tag data from portable identification tag 29b and transmits the read tag data to station relay unit 40 via retransmitter 42. As data storage device 32b is already registered with station relay unit 40, station relay unit 40 transmits tag data from portable identification tag 29b read by secondary tag reader 36 and the identifier of data storage device 32b to central control device 46.

Central control device 46 checks if both data storage device 32b and tag data from portable identification tag 29b are recorded as being associated with the same vehicle, and if the vehicle is authorized to receive the requested goods and services from non-fuel product dispenser 20.

If authorized, central control device 46 instructs station relay unit 40 to issue an authorization signal to non-fuel product dispenser 20 and/or to secondary tag reader 36.

When the acquisition of goods and services from non-fuel product dispenser 20 is complete, the price of the goods and services and a price of the purchase at non-fuel product dispenser 20 are received by station relay unit 40 from non-fuel product dispenser 20 and transmitted by station relay unit 40 to central control device 46 for storage.

In the embodiments of the present invention discussed above, if central control device 46 fails to match an identifier of data storage device 32 with tag data from an identification tag 30 or 29, central control device 46 simply does not instruct that an authorization signal be issued. In embodiments of the present invention, a failure to match is assumed to indicate theft or other misconduct and an alarm is sounded.

In the embodiments of the present invention discussed above, central control device 46 instructs that an authorization signal be issued when an identifier of data storage device 32 matches tag data from an identification tag 30 or 29. In embodiments of the present invention, an authorization signal is issued contingent on the driving behavior as revealed by analysis of the vehicular data recorded by data storage device 32. Before the authorization signal is issued, the vehicular data is analyzed for evidence of meter malfunction, tampering with the meter (e.g., suspicious gaps in recorded data), speeding, driving in forbidden areas, acceleration or turning indicative of bad or dangerous driving, fuel use indicative of theft or abuse, and the like.

In the embodiment described hereinabove, a data storage device 32 at a service station 10 transmits a data storage device identifier that is received and stored in a list of data storage devices 32 currently in service station 10. When it is desired to authorize a purchase or activate a fuel dispenser 18, an identification tag 29 or 30 is read and the list of data storage devices 32 in service station 10 is interrogated to identify if a data storage device 32 associated with the read identification tag 29 or 30 is located in service station 10.

In an embodiment, a data storage device 32 at a service station 10 transmits a data storage device identifier as well as an identity of one or more identification tags 29 and 30 associated therewith, all that are stored in a list of data storage devices 10 currently in station 10. When it is desired to authorize a purchase or activate a fuel dispenser 18, the stored identities of associated identification tags 29 and 30 are used as an index to simplify the interrogation to identify if a data storage device 32 associated with the read identification tag 29 or 30 is located in service station 10.

Embodiments of the present invention are additionally configured for off-line operation. Such embodiments are useful, for example, when for technical reasons there are difficulties in communication with a central control device 46 so that an authorization signal must be generated locally by station relay unit 40 so as not to disappoint customers, but at the same time not to facilitate fuel theft when technical difficulties occur.

In embodiments, a data storage device 32 and/or an identification tag 29 or 30 store data used by station relay unit 40 for generating an authorization signal locally in an off-line situation. For example, in embodiments data storage device 32 stores payment information, credit account information, credit rating information, off-line credit rating information and/or fuel supply policy, which, depending on the embodiment, are used together or apart by station relay unit 40 to generate an authorization signal. For example, in embodiments an identification tag 29 or 30 stores payment information, credit account information, credit rating information, offline credit rating information and/or fuel supply policy, which, depending on the embodiment, are used together or apart by station relay unit 40 to generate an authorization signal.

To increase security in off-line situations, in embodiments a data storage device 32 stores and transmits an identity of one or more identification tags 29 and 30 associated therewith and/or an identification tags 29 and 30 stores a meter identifier of a data storage device 32 associated therewith. In an off-line situation, station relay unit 40 locally determines an association between a data storage device 32 and an identification tag 29 or 30 in order to generate an authorization signal.

In embodiments, central control device 46 periodically transmits an updated "black-list" to station relay unit 40. Such a "black-list" is continuously updated and includes a listing of data storage devices 32 and identification tags 29 and 30 that it is desired to limit the amount of purchases or to forbid purchases. If station relay unit 40 is forced to operate off-line, any request for authorization is checked with reference to the most recent "black-list".

In embodiments, the teachings of the present invention are used to implement a method of selling merchandise (that is goods and services, including fuel) at a fuel-dispensing station. To this end, each of a group (or all) clients is provided with a first identification tag affixed to a vehicle (such as an identification tag 30 as described above) and a second identification tag (such as a data storage device 32 as described above). A record associating the first identification tag, the second identification tag and a payment mechanism is maintained, for example at a central control device 46. A person (e.g., 28b) desiring to purchase fuel for a vehicle (e.g. 24b) presents a first tag (e.g., 30b) affixed to the vehicle and a second tag (e.g., 32b), where presenting means that the tag (30b or 32b) is positioned to be read by an appropriately configured tag reader. The identity of the presented first tag and the presented second tag are determined and the records examined. If the presented first tag and the presented second tag are recorded as being associated, the purchase is authorized and the price of the fuel debited from the payment mechanism. In such a way, the possibility of fuel theft is reduced, for example as may result by theft of one of the two tags.

In embodiments, some or all of the clients are also provided with a portable third identification tag (such as a tag 29 described above) and a record maintained associating the portable third identification tag with the first and second identification tag as well as with a payment mechanism of the client. A person (e.g., 28a) desiring to purchase non-fuel merchandise presents a second tag (e.g., 32a) and a third portable tag (e.g., 29a). The identity of the presented second tag and the presented portable third tag are determined and the records examined. If the presented second tag and the presented portable third tag are recorded as being associated, the purchase is authorized and the price of the merchandise debited from the payment mechanism. In embodiments, authorization of purchases performed with a presented portable third tag also requires identification of a first tag (e.g., 30a) affixed to a vehicle and determining that the presented first tag, the presented second tag and the presented third tag are associated.

In embodiments, the determination of the identity of a presented second identification tag occurs only when the second identification tag is in the immediate proximity of the vehicle.

In embodiments, the determination of the identity of the presented second identification tag occurs only when the vehicle is in the fuel-dispensing station (e.g., 10). Implementation of such embodiments includes, for example, appropriate positioning of the reader of the second identification tag. Such embodiments are exceptionally important for purchases of non-fuel products where authorization is based on determining the association of a portable third identification tag and a second identification that is not necessarily affixed to a vehicle.

One skilled in the art recognizes that embodiments of the present invention have many advantages over methods known in the art.

For example, in service stations, establishment of a communication link is often initiated by the service station periodically (e.g., once a second) broadcasting to all non-linked transceivers associated with customers. All non-linked transceivers in range respond and the link-establishing process is initiated with each transceiver.

In other cases, establishment of a communication link is initiated by a transceiver associated with a customer that is not linked to a service station. Each such non-linked transceiver periodically broadcasts to a service station. If a service station responds, the link-establishing process is initiated.

As is known to one skilled in the art, a problem with such methods is that resources are wasted in establishing unneeded communication links. These methods do not have procedures for identifying which transceivers are interested in establishing a link and which transceivers are only incidentally in range, for example driving by on a nearby road or parked in the service station for some reason.

In contrast, embodiments of the present invention are more efficient in the use of resources where a link-establishing procedure is initiated between a service station and a non-linked transceiver (e.g., a data storage device of the present invention) by the service station only after the service station knows the identity of the non-linked transceiver and knows that the transceiver is interested in such a link, e.g., by reading an identification tag or a portable identification tag of the present invention.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Methods and processes have been described herein as a series of steps in an order selected as being the easiest to understand. It must be emphasized that such order is not limiting, and any method or process may be performed in any reasonable order to achieve the desired result.

Although the invention has been described in conjunction with specific embodiments thereof, it is evident that many alternatives, modifications and variations will be apparent to those skilled in the art. Accordingly, the present invention is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A method of selling merchandise at a fuel-dispensing station comprising:
   a) to each client,
      i) providing a first identification tag affixed to a vehicle;
      ii) providing a second identification tag; and
      iii) providing said client with a portable third identification tag and maintaining a record associating said third identification tag with said first identification tag, said second identification tag and a payment mechanism;
   b) when a person desires to purchase fuel for a vehicle,
      iv) determining the identity of a first identification tag affixed to said vehicle and a second identification tag presented by said person;
      v) by examining said record, ascertaining if said affixed first identification tag and said presented second identification tag are associated; and
      vi) if said affixed first identification tag and said presented second identification tag are associated, issuing in the fuel-dispensing station an authorization for the purchase of said fuel by said person and debiting the price of said fuel from said payment mechanism; and
   c) when a person desires to purchase non-fuel merchandise,
      vii) determining the identity of a third identification tag and a second identification tag presented by said person;
      viii) by examining said record, ascertaining if said presented third identification tag and said presented second identification tag are associated; and
      ix) if said presented third identification tag and said presented second identification tag are associated, authorizing said purchase of said merchandise by said person and debiting said payment mechanism.

2. The method of claim 1, further comprising:
   e) providing a client with a portable third identification tag and maintaining a record associating said third identification tag with said first identification tag, said second identification tag and said payment mechanism; and
   f) when a person desires to purchase non-fuel merchandise,
      x) determining the identity of a first tag affixed to a vehicle associated with said person, a said third identification tag and a second identification tag presented by said person;
      xi) by examining said record, ascertaining if said presented third identification tag, said affixed first identification tag and said presented second identification tag are associated; and
      xii) if said affixed first identification, said presented third identification tag and said presented second identification tag are associated, authorizing said purchase of said merchandise by said person and debiting said payment mechanism.

3. The method of claim 1, wherein said presented first identification tag is affixed in proximity to a fuel inlet of said vehicle and said determining the identity of said presented first tag comprises using a tag reader configured to determine the identity of a first identification tag affixed to a vehicle when a fuel dispensing nozzle is engaged to dispense fuel through a fuel inlet of a said vehicle.

4. The method of claim 1, wherein a said first tag is a passive device.

5. The method of claim 1, wherein a said second identification tag is configured to transmit data relating to use of a said vehicle recorded by a meter device.

6. The method of claim 1, wherein a said second identification tag comprises a wireless transmitter.

7. The method of claim 1, wherein determination of the identity of said presented second identification tag occurs when said second identification tag is in the immediate proximity of said vehicle.

8. The method of claim 1, wherein determination of the identity of said presented second identification tag occurs when said second identification tag is in the immediate proximity of said vehicle.

* * * * *